June 9, 1959 W. L. MORRISON 2,889,953
INSULATED TANK WITH IMPERVIOUS LINING
Filed Feb. 4, 1954
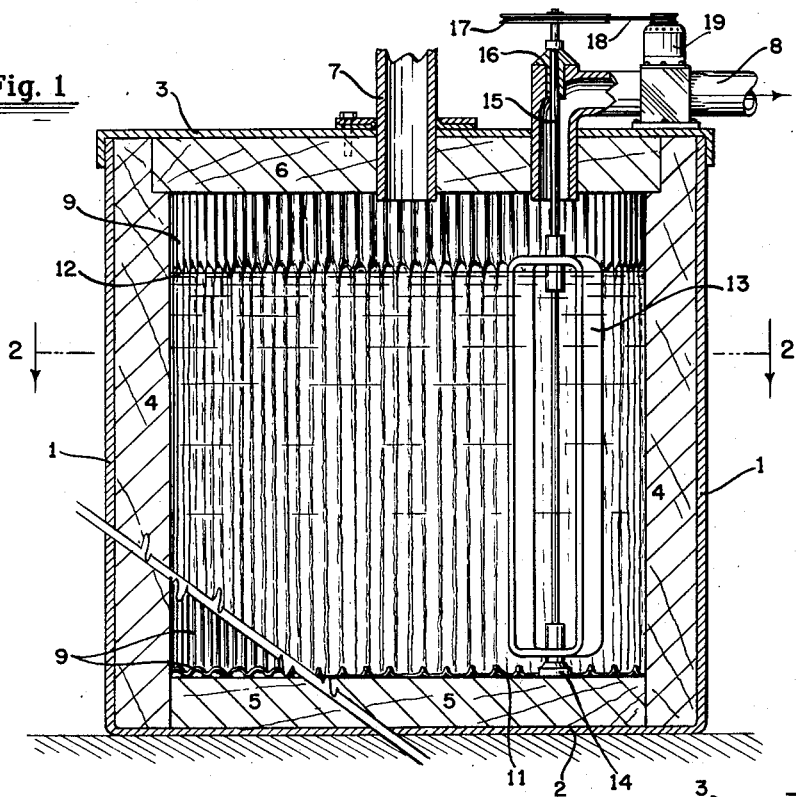
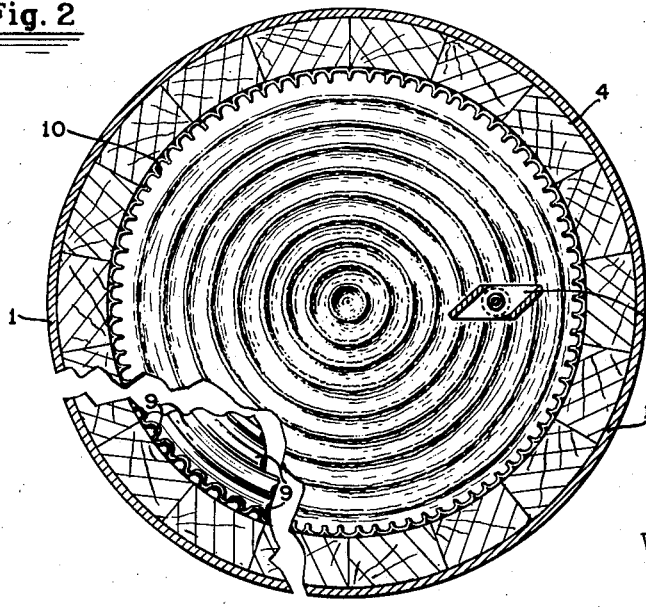
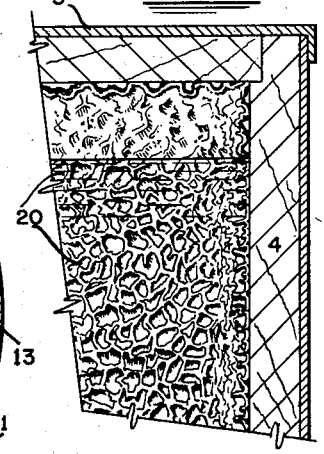
INVENTOR,
WILLARD L. MORRISON
ATTORNEY,
PARKER & CARTER

United States Patent Office 2,889,953
Patented June 9, 1959

2,889,953

INSULATED TANK WITH IMPERVIOUS LINING

Willard L. Morrison, Lake Forest, Ill., assignor, by mesne assignments, to Constock Liquid Methane Corporation, a corporation of Delaware Application February 4, 1954, Serial No. 408,220

6 Claims. (Cl. 220—9)

My invention relates to improvements in insulated containers for liquefied hydrocarbon gases and the like and has for one object to provide a container wherein such liquefied hydrocarbons, such as methane, may be stored at temperatures far below zero F., for example, —258° F. and at atmospheric pressure.

In general, I propose a metal tank lined with a self-supporting insulating lining for example of balsa wood, the lining being pre-stressed at normal above freezing temperatures by the constrictive action of the metal tank wall or shell so that when the very cold liquid is placed in the tank, the insulating lining as a result of its chilling by the liquid will not shrink sufficiently to leave any effective gaps or spaces between the elements of the lining so that the lining will furnish even at these low temperatures, a barrier to access of the liquid through the insulating lining to the tank wall or shell.

In other words, I propose by any suitable means which form no part of the present invention to so install the insulating lining in the tank that the shrinkage resulting from the cold will be less than the compression of the lining resulting from its installation.

In order to prevent passage of the liquid through the interstices or pores of the insulating lining, I propose to line the self-supporting insulating lining with a thin non self-supporting lining or layer of metal foil which will be attached to and supported by the insulating lining.

This foil or skin supported by the insulating lining will be so thin and of such little strength that without the backing of the insulating lining, it would not support the hydraulic pressure of the liquid contents of the tank. Such lining or skin may preferably be installed in the first instance in the form of a corrugated or wrinkled sheet so that while expansion or contraction of this skin, if the skin were perfectly plane and smooth might cause fracture thereof, the corrugations or the wrinkling will permit expansion and contraction of the skin without resultant fracture.

When such skin is installed at room temperature and when the tank is thereafter filled with the cold liquid, the hydrostatic pressure will cause the corrugations to collapse against the supporting insulating lining, thus lining the tank with a skin which presents a scabrous surface.

This scabrous surface is of the utmost importance because it presents to the liquid contents of the tank a multiplicity of sharp points or lines which may form nuclei or points of emergence of the liquid in gaseous phase.

It is well known that the storage of cold liquids of the general character for which this tank is intended, there is danger of what the physicists call bumping. That is, as heat enters the mass through the insulating shell, large portions of the liquid mass may suddenly burst into vaporous phase but if continuous vaporization is insured, bumping will be prevented.

The multiplicity of sharp points resulting from the scabrous surface provide a base on which such continuous vaporization may take place so that as heat enters the liquid mass, a continued, controlled vaporization or gasification takes place and such gas can be easily discharged from the tank at atmospheric pressure so that the outer metal shell needs to be designed only to support the weight of the liquid and does not have to be designed to support the gaseous pressure.

Another means by which I propose to prevent bumping is to cause a gentle agitation of the liquid. Such gentle mechanical agitation also serves to insure a continuous vaporization rather than bumping.

My invention is illustrated more or less diagrammatically in the accompanying drawings, wherein:

Figure 1 is a vertical section through the tank;
Figure 2 is a section along the line 2—2 of Figure 1;
Figure 3 is a vertical section through a modified form of the tank.

Like parts are indicated by like characters throughout the specification and drawings.

1 is a cylindrical shell having a bottom 2 and a top 3 made of steel or any other suitable material. 4 indicates a series of staves of balsa wood or similar self-supporting insulating material lining the cylindrical shell 1. 5 is a floor of similar insulating material masking the bottom 2 and top 3 of the tank from contact with the liquid. 7 is a duct through which cold liquid may be introduced into the tank and 8 a duct through which the liquid in vaprous phase may be discharged from the tank as it is vaporized as a result of ambient heat through the insulating lining. The valves, controls and other means which will be associated with the ducts 7 and 8 form no part of the present invention and are not here illustrated. 9 indicates a thin corrugated metal foil skin supported by the lining 4, 5 and 6. Such corrugated skin may be attached to the insulating lining by any suitable cementing means as may be desired so that the foil is supported by and held in place by the insulating lining. Figures 1 and 2 are cut away to show the shape of the skin upon installation. The remainder of the figures show the skin after the tank has been filled. In this case the corrugations are more or less collapsed with resultant multiplicity of sharp edges 10 extending vertically of the tank along the cylindrical lining 4 and supported on the bottom 5 as indicated at 11, the weight of the liquid forcing the corrugated skin against the insulating lining even where it is not cemented in place, the hydrostatic pressure flattening out the corrugations and causing, because of the excess length of the foil, to take the form of a multiplicity of sharp edges.

12 indicates the level of the liquid. Above the level of the liquid the skin tends to remain corrugated in contrast with its flattened, sharpened, lined contour below 12 where hydrostatic pressure has forced it outwardly against the lining 4.

13 is a paddle rotatably mounted on the pedestal 14 at the bottom of the tank having an upwardly extending shaft 15 rotatably mounted in a bearing 16 extending through and carried by the duct 8. 17 is a drive wheel, 18 a belt and 19 a motor which rotates the paddle to agitate the liquid.

In the modified form shown in Figure 3 instead of a skin of regular corrugation as indicated in Figures 1 and 2, the skin is wrinkled or crumpled as at 20 just as is characteristic of any pieces of metal foil when they are crushed up in the hand and straightened out. These corrugations or wrinklings give the skin the same measure of expansion possibility which is characteristic of the regular corrugation of Figures 1 and 2. The effect is the same. Hydrostatic pressure forces the foil against the insulating lining and when the foil expands or contracts under changes in temperature, such expansion and contraction may take place without breaking or puncturing of the foil surface.

The foil, of course, will be of substantially uniform thickness throughout. The wrinkled effect or the corrugation followed by the collapsing against the lining giving an irregular surface which I prefer to describe as a scabrous surface, the scabrous surface may or may not have uniform roughness but in any event, it is a continuous scabrous surface which always presents to the liquid a surface which promotes and tends to localize formation of gas bubbles as the liquid passes from liquid to gaseous phase.

The modification of Figure 3 showing the foil as if it had been crumpled and then flattened out presents to the liquid a crackled surface which has the appearance of being covered with minute cracks but which actually is covered with a series of projecting and random wrinkles which present to the liquid a multiplicity of sharp surfaces on which or about which gas bubbles may form.

When the hydrostatic pressure of the liquid collapses the corrugations against the insulating lining, the resultant sharp ribs are formed by compressing together two adjacent portions of the foil so that the thickness of the rib is substantially twice the thickness of the foil.

The handling, storage and shipment of such hydrocarbons as methane in liquid phase is an operation that requires maximum security against the possibility of undesired, improperly timed escape of the hydrocarbon either in gaseous or liquid phase. Especially when shipment is to be made for long distances on barges or ocean-going tankers, there is always danger that liquid at very low temperatures might penetrate through the insulating lining and contact and dangerously reduce the temperature of the steel wall of the tank. This might result in condensation or frost formation on the outside of the tank or it might even result in weakening the tank wall. It is for this reason that I propose to face the insulating lining with an impervious layer, preferably of metal foil though it might be of suitable plastic or textile material rendered impervious by plastic or the like and not subject to loss of strength or impairment as a result of the presence of the cold liquefied hydrocarbon. Such impervious lining will positively prevent escape of liquid or gas into the insulating lining and so will effectively prevent contact between the liquid and the steel tank wall.

However, in any commercial operation it is well known that accidents occur, defects in structure develop and so there is always the possibility that the impervious lining might spring a leak. If it does, the liquid or the gas may penetrate it and enter into the pores of the insulating lining but such a leak will be of such small magnitude that if liquid leaks out into the insulating lining, it will be in a sufficiently small quantity so that ambient heat penetrating through the steel wall of the tank and through the insulating lining will be vaporized before a sufficient quantity to do any harm reaches the steel tank wall. The vaporization of any such limited quantity of the liquid will merely tend, because of the tremendous expansion ratio between the gas and the liquid to fill the pores of the insulating lining with the gas itself and no harm will be done. Such gas would migrate along the pores and ultimately find its way along the wall of the tank toward the discharge opening and will join the controlled amount of hydrocarbon in gaseous phase leaving the tank.

While under many if not all circumstances of properly designed and properly assembled insulating lining in the tank it is entirely safe to have the liquid actually engage and penetrate the pores of the insulating lining. The provision of the impervious lining adds an additional safety factor in that such lining maintains a constant distance between the cold liquid mass and the steel tank shell.

If desired, the foil no matter what its actual contour may before it is applied to the insulating lining be first cemented to graph paper or the like. The cementing of foil and cellulosic material together can easily be done when that cellulosic material takes the form of paper and then the paper can be very easily cemented to the insulating lining, thus making it easier to handle the foil in insulation with minimum risk of tearing or puncturing since it is protected by the paper and making it easier to cement one cellulosic material to another.

If desired also the foil may take the form of a sandwich cemented between two pieces of paper, the paper being sufficiently rough, irregular with fibrous projections and the like, providing the points about which the gas may form as vaporization takes place.

30 indicates an exhaust passage communicating with the exhaust from the tank controlled by valve 31 which makes it possible to control from the space between the impervious lining and the insulating lining any gas which may be found in that space.

This application is a continuation in part of my co-pending applications Serial No. 288,214, now abandoned, filed May 16, 1952, for Insulating Container and Method of Storing Cold Liquefied Volatile Hydrocarbons and Serial No. 354,216, now abandoned, filed May 11, 1953, for Insulating Container and Method of Storing Cold Liquefied Gas.

I claim:

1. In the storage of a liquefied hydrocarbon gas in large volume at atmospheric pressure, the combination of a liquefied hydrocarbon gas having a boiling point considerably below 0° F. at atmospheric pressure and a container of large capacity in which the liquefied hydrocarbon gas is stored at about atmospheric pressure comprising a shell of a vapor and fluid impermeable material of high structural strength, a relatively thick layer of a porous insulating material of low heat conductivity supported as a lining against the inner wall of the shell, and a thin layer of a fluid impervious material supported as a lining on the inner wall of the insulating layer and extending continuously as a barrier between the porous lining and the liquefied hydrocarbon gas within the container, said thin layer being incapable of self-sufficiency and having corrugations extending in all directions throughout to enable movement in response to forces of expansion and contraction and to provide points to initiate boiling in contact with the entire surface of the liquefied hydrocarbon gas which is in heat-transfer relation with the container.

2. In the storage of a liquefied hydrocarbon gas in large volume at atmospheric pressure, the combination of a liquefied hydrocarbon gas having a boiling point considerably below 0° F. at atmospheric pressure, a container of large capacity in which the liquefied hydrocarbon gas is stored at about atmospheric pressure comprising a metal shell, a relatively thick layer of a porous insulating material of low heat conductivity supported as a lining against the inner wall of the shell, and a thin foil of a fluid impervious material supported as a lining against the inner wall of the insulating layer and extending continuously as a barrier between the porous lining and the liquefied hydrocarbon gas within the container, said foil being incapable of self-sufficiency and having corrugations extending in all directions throughout to enable shifting movement responsive to expansions and contractions and to provide a scabrous surface in surface contact with the liquefied hydrocarbon gas which is in contacting relation with the walls of the container.

3. A system as claimed in claim 2 in which the thin foil extending throughout between the liquefied hydrocarbon gas and the porous insulating layer comprises a metal foil.

4. The system as claimed in claim 2 in which the porous layer of an insulating material is formed of balsa wood.

5. In the storage of liquefied natural gas in large volume at atmospheric pressure the combination with the liquefied natural gas having a boiling point considerably below 0° F. at atmospheric pressure of a container of large capacity in which the liquefied natural gas is stored at about atmospheric pressure comprising a metal shell, a layer of a porous insulating material extending throughout the inner surface of the shell as a lining, and a thin metal foil extending continuously as a lining supported on the inner surface of the insulating layer to separate the insulating layer from the liquefied natural gas within the container, said foil having a scabrous surface to enable displacement responsive to expansions and contractions and to provide points in contact with the entire surface of the liquefied natural gas in heat-transfer relation with the insulated container to provide points for initiating boiling.

6. The system as claimed in claim 5 in which the natural gas contains a high proportion of methane having a boiling point of —258° F. at atmospheric pressure.

References Cited in the file of this patent

UNITED STATES PATENTS

| | | |
|---|---|---|
| 2,033,268 | Widman | Mar. 10, 1936 |
| 2,113,728 | Harrison | Apr. 12, 1938 |
| 2,143,976 | Crosley et al. | Jan. 17, 1939 |
| 2,260,393 | McCarthy | Oct. 28, 1941 |
| 2,314,876 | Greene | Mar. 30, 1943 |
| 2,316,437 | Kercher | Apr. 13, 1943 |
| 2,364,943 | Brandt | Dec. 12, 1944 |
| 2,416,924 | Jones | Mar. 4, 1947 |
| 2,504,314 | Fieck | Apr. 18, 1950 |
| 2,676,773 | Sanz et al. | Apr. 27, 1954 |
| 2,705,661 | Meissner | Apr. 5, 1955 |